United States Patent [19]
Daigle et al.

[11] Patent Number: 6,015,102
[45] Date of Patent: Jan. 18, 2000

[54] EXTERNAL EMITTER FOR DRIP IRRIGATION HOSE

[75] Inventors: Harold Daigle; Mark Huntley, both of San Diego, Calif.

[73] Assignee: T-Systems International, Inc., San Diego, Calif.

[21] Appl. No.: 09/136,354

[22] Filed: Aug. 18, 1998

Related U.S. Application Data

[60] Provisional application No. 60/055,992, Aug. 18, 1997.

[51] Int. Cl.$^7$ .............................. B05B 15/00; B05B 1/30
[52] U.S. Cl. ................ 239/542; 239/533.13; 239/553.5; 239/562; 239/DIG. 12
[58] Field of Search ..................................... 239/542, 548, 239/553, 553.3, 553.5, 533.1, 533.13, 562, DIG. 12

[56] References Cited

U.S. PATENT DOCUMENTS

| | | | |
|---|---|---|---|
| 3,896,999 | 7/1975 | Barragan | 239/107 |
| 3,899,135 | 8/1975 | O'Brian | 239/534 |
| 4,209,133 | 6/1980 | Mehoudar | 239/542 |
| 4,392,616 | 7/1983 | Olson | 239/271 |
| 4,718,608 | 1/1988 | Mehoudar | 239/542 |
| 4,722,759 | 2/1988 | Roberts et al. | 156/203 |
| 4,880,167 | 11/1989 | Langa et al. | 239/542 |
| 5,052,625 | 10/1991 | Ruskin | 239/542 |
| 5,118,042 | 6/1992 | Delmer | 239/542 |
| 5,785,785 | 7/1998 | Delmer et al. | 156/203 |

*Primary Examiner*—Andres Kashnikow
*Assistant Examiner*—Robin O. Evans
*Attorney, Agent, or Firm*—Christie, Parker & Hale, LLP

[57] ABSTRACT

A drip irrigation hose comprises a tubular body enclosing a water supply passage. An external emitter is attached to the outside of the tubular body. The emitter comprises a front wall, a back wall, side wall and a top wall that defining a flow regulating channel. The emitter further comprises an outlet in at least one of the walls. The hose further comprises an inlet to the emitter.

The inlet is in fluid communication with the water supply passage in the hose and the flow regulating channel in the emitter. Water flows through the water supply passage, through the inlet into the emitter, through the flow regulating channel, and out the outlet. The emitter can further comprise a purging bulb to provide a simple and efficient way for the farmer to unclog the emitter.

26 Claims, 8 Drawing Sheets

EXTERNAL EMITTER FOR DRIP IRRIGATION HOSE

CROSS-REFERENCE TO RELATED APPLICATIONS

This application claims priority of U.S. Provisional Application No. 60/055,992, filed Aug. 18, 1997, the disclosure of which is incorporated herein by reference.

FIELD OF THE INVENTION

This invention relates to drip irrigation hoses, and more particularly drip irrigation hoses having external emitters.

BACKGROUND OF THE INVENTION

Drip irrigation systems have come into widespread use in the agricultural area. Drip irrigation systems supply water at a slow, controlled rate to the root zone of the particular plants being irrigated. Typically, drip irrigation is accomplished by providing a low volume water outlet at each plant that permits a limited dripping of water directly to the root zone of the particular plant. Because evaporation, runoff, overwatering, and watering beyond the root zone are eliminated, substantial water and nutrient savings are realized. In addition, drip irrigation reduces contaminants to the water table by enabling the farmer to supply only enough water and fertilizer to reach the plants, reducing excess water that would run off and contaminate the water table below.

Emitters are used to control the flowrate of the water exiting the hose. Emitters can be located within the hose (internal emitters) or on the outside of the hose (external emitters). Generally, external emitters comprise a barb that punctures and extends through the wall of the hose. The barb contains an internal passage to provide a means for water to pass from the inside of the hose into the emitter. Such emitters are generally awkward due to the relatively large bumps protruding from the side of the hose, making it more difficult to roll the hose. Additionally, these emitters are subject to damage during initial installation and tend to break off. Moreover, if a broken or clogged emitter is removed and replaced with a new emitter, the hole into which the barb extends tends to stretch, increasing the likelihood of leaks. Further, due to the barb extending inside the hose, the water is subject to friction loss inside the hose. Thus, a need exists for a trouble-free emitter that overcomes these drawbacks.

Additionally, drip irrigation hoses tend to be relatively long to be able to extend across a field. As the water travels along the hose away from the water source, the pressure of the water decreases. Thus, the water pressure at the beginning of the hose (near the water source) is greater than that at the far end of the hose. Because the drip rate of the hose is a function of the water pressure, the drip rate at the beginning of the hose tends to be greater than at the end of the hose. The drip flow rate of such a hose is proportional to the water pressure at the inlet to the emitters raised to the exponent x. In the absence of pressure compensation, the x-factor is one, i.e., the flow rate is a linear function of the pressure. In the ideal case of perfect pressure compensation, the x-factor is zero, i.e., the flow rate is independent of pressure. Thus, the x-factor is a measure of the degree of pressure compensation—the lower the x-factor, the greater the pressure compensation. Generally, a hose having an x-factor of about 0.5 is considered to be somewhat pressure-compensating. A hose having an x-factor of 0.1 is considered highly pressure-compensating. Thus, it is desirable to incorporate pressure-compensating designs into the hoses to reduce the effect of the pressure difference over the length of the hose on the drip rate along the length of the hose.

Further, emitters tend to get clogged or plugged by dirt and other debris that finds its way into the emitter. Once the emitter is clogged, few practical alternatives exist for purging or clearing out the debris so that adequate water flow to the plant can resume. The farmer must often discard and replace the existing emitter or insert another near the plugged one, which can be very labor-intensive and expensive. Thus, a need exists for an external emitter that provides the farmer or other user with a simple way to unplug any debris.

SUMMARY OF THE INVENTION

The present invention is directed to an external emitter for use in a drip irrigation hose, which may be pressure-compensating. The present invention solves the above drawbacks by providing a relatively inexpensive emitter design and a practical way to service an emitter which is clogged with sediment or debris.

In one embodiment, the invention is directed to a drip irrigation hose comprising a tubular body enclosing a water supply passage. An external emitter is attached to the outside of the tubular body. The emitter comprises a front wall, a back wall, side wall and a top wall that defining a flow regulating channel. The emitter further comprises an outlet in at least one of the walls. The hose further comprises an inlet to the emitter. The inlet is in fluid communication with the water supply passage in the hose and the flow regulating channel in the emitter. Water flows through the water supply passage, through the inlet into the emitter, through the flow regulating channel, and out the outlet.

The emitter is attached to the outside of the hose by any suitable means, preferably by adhesive bonding. To achieve a seal between the emitter and the hose, the front wall, back wall and side walls are adhered to the hose. By the above design, the emitter can be located entirely outside the hose.

The emitter can be pressure-compensating or non-pressure compensating. In one embodiment of a hose having a pressure-compensating emitter, the inlet and outlet are both located near the back wall of the emitter. The emitter is similar to that described above and further comprises a flexible member having front and back ends that divides that flow regulating channel into first and second parallel regions. The front end of the flexible member is attached near the front wall of the emitter, and the back end of the flexible emitter extends near, but not contacting, the back wall of the emitter. In operation, water flows into the emitter through the inlet, through the first parallel region, around the back end of the flexible member, through the second parallel region and out the outlet. The flexible member preferably is capable of deforming into the second parallel region upon increased pressure in the first parallel region, which can be on the side of or above the second parallel region.

In another embodiment of a hose according to the invention, the emitter as generally described above further comprises a purging bulb. The purging bulb has an internal region in fluid communication with the flow regulating channel so that pressure exerted on the purging bulb generates local pressure to back-flush or eject contaminants in the emitter.

DESCRIPTION OF THE DRAWINGS

These and other features and advantages of the present invention will be better understood by reference to the following detailed description when considered in conjunction with the accompanying drawings, where same reference numerals identify similar elements, wherein.

DETAILED DESCRIPTION

Figures 1A, 1B:
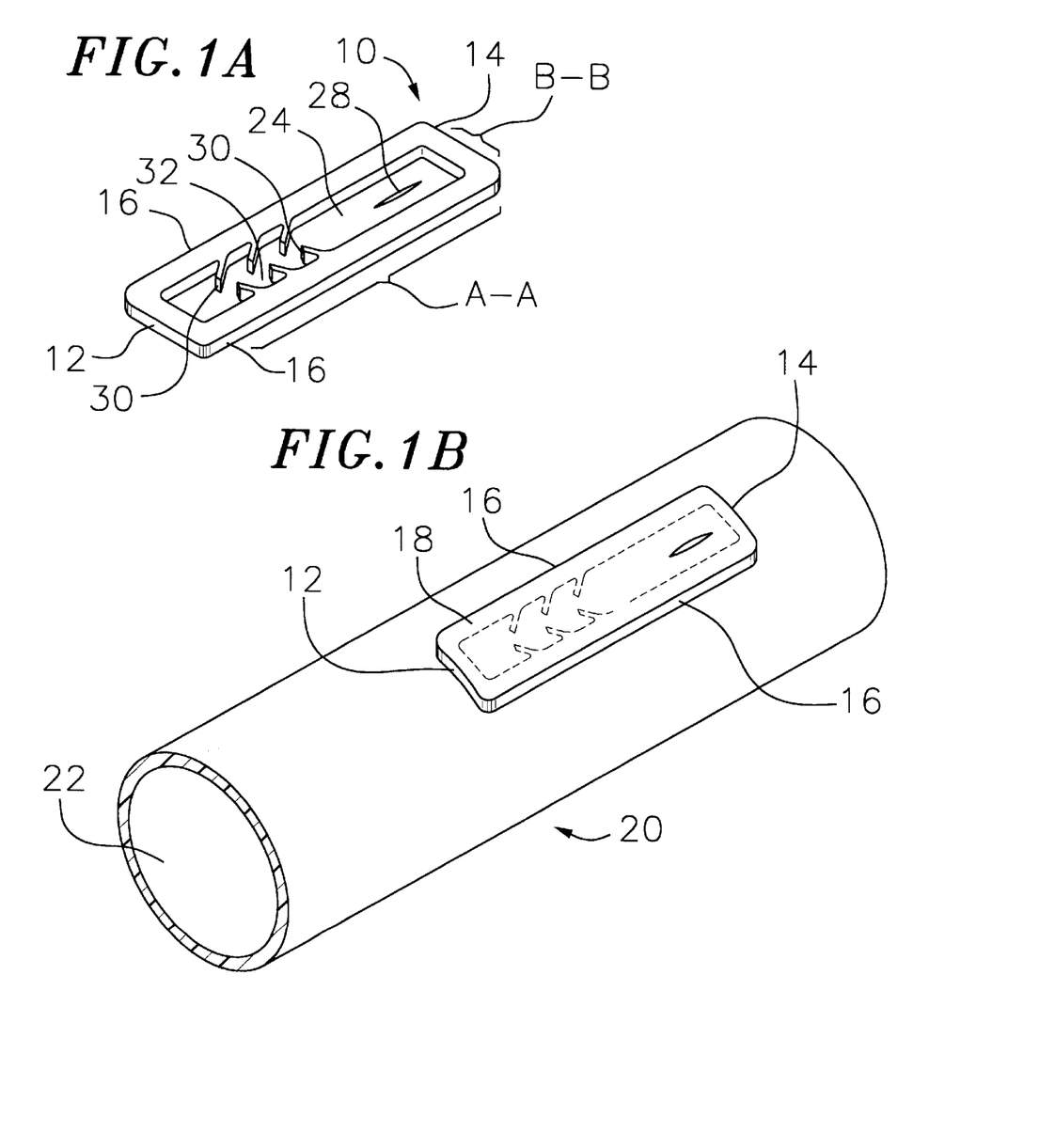
FIG. 1A is a perspective view of the bottom side of an emitter in accordance with the invention.
FIG. 1B is a perspective view of a drip irrigation hose with the emitter of FIG. 1A attached to its outside surface.
Figure 2A:
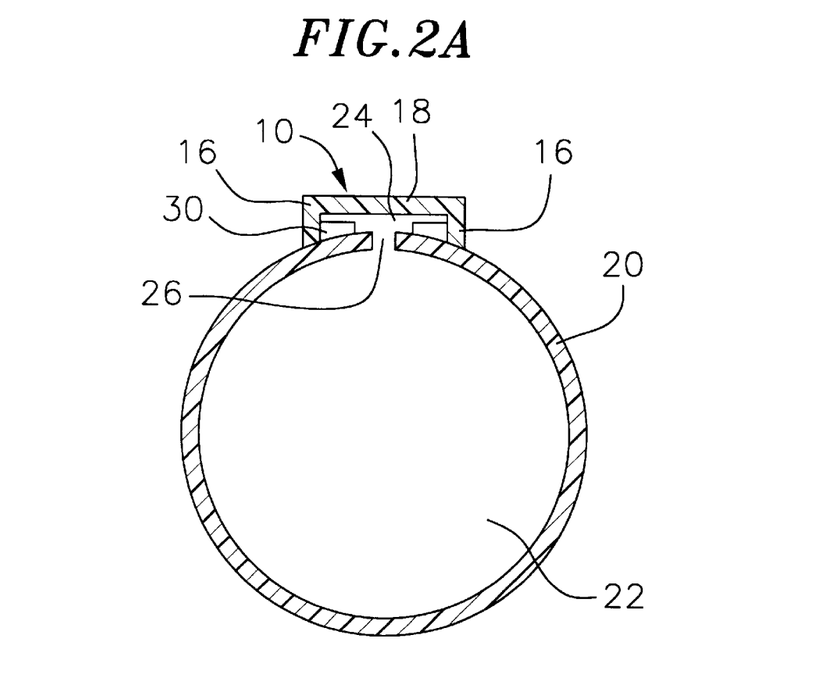
FIG. 2A is a cross-sectional view of the hose of FIG. 1B.

The present invention is directed to external emitters for use in drip irrigation hoses, and drip irrigation hoses having external emitters. In one embodiment, as depicted in FIGS. 1A, 1B and 2A, the emitter 10 is attached to the outside of a drip irrigation hose 20. The hose 20 comprises a generally tubular body containing a water supply passage 22 in its interior.

The emitter 10 depicted in FIGS. 1A, 1B, and 2A is a unibody emitter, i.e., a single-piece emitter that forms an inseparable assembly. Examples of unibody emitters are disclosed in U.S. patent application Ser. No. 09/112,866, filed Jul. 9, 1998, entitled "Unibody Pressure-Compensating Emitter", the disclosure of which is incorporated herein by reference. The emitter 10 comprises a front wall 12, a back wall 14, two side walls 16, and a top wall 18. These walls, along with the wall of the hose 20, form at least one flow regulating channel 24 within the emitter 10. The emitter 10 preferably has a generally-rectangular shape and is designed so that the length of the flow regulating channel 24, designated by line A—A, is greater than its width, designated by line B—B.

The emitter 10 is positioned on the hose 20 so that the bottom sides of the front wall 12, back wall 14, and side walls 16 are in contact with the outside of the hose. Water enters the emitter 10 through an inlet 26, which is an opening in the hose 20 positioned at the end of the flow regulating channel 24 nearest the front wall 12 of the emitter. The emitter 10 further comprises at least one outlet 28 in its top wall, near the back wall 14, to permit water to exit the emitter. The outlet 28 is preferably a slit outlet, but alternatively could comprise one or more holes or any other suitable opening. In operation, water enters the emitter 10 through the inlet 26, flows through the flow regulating channel 24, and exits the emitter through the outlet 28.

Figure 2B:
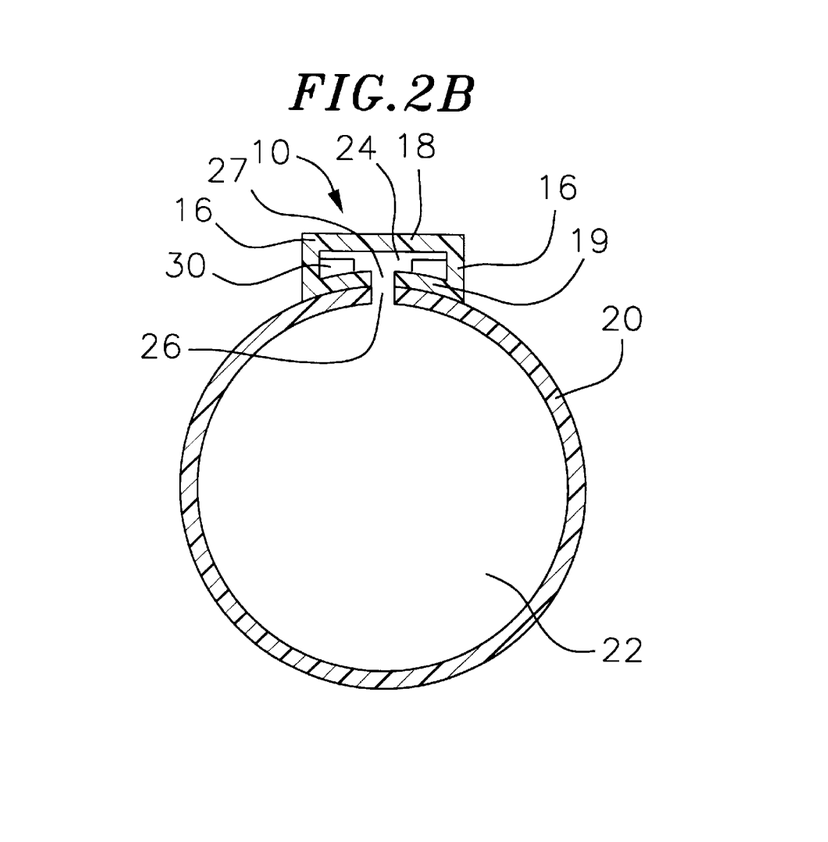
FIG. 2B is a cross-sectional view of an alternative embodiment of a hose containing an external emitter according to the invention, wherein the emitter has a bottom wall.

Alternatively, the emitter 10 could further comprise a bottom wall 19, which would be in contact with the outer wall of the hose 20, as shown in FIG. 2B. In this design, the bottom wall 19 contains an inlet opening 27 aligned with the inlet 26 in the hose 20 to permit water to enter the emitter 10. However, an emitter 10 with a bottom wall 19 is less desirable because it requires that the inlet opening 27 of emitter be aligned with the inlet 26 in the hose 20.

The flow regulating channel 24 can have any suitable configuration known to those skilled in the art. Preferably the flow regulating channel 24 comprises at least one resistance element, i.e., an element that creates resistance to flow, which in turn creates a pressure drop. Preferred resistances elements are baffles 30 (or chevrons) that form a turbulent flow section 32. As shown in FIG. 1A, the alternating baffles 30 of the turbulent flow section 32 form a serpentine flow path. An example of such a design is described, for example, in the above-references U.S. patent application Ser. No. 09/112,866, the disclosure of which is incorporated herein by reference. Alternatively, the flow regulating channel 24 can comprise a turbulent flow section 32 having a labyrinth-type serpentine path, such as that described in U.S. Pat. No. 4,880,167, the disclosure of which is incorporated herein by reference. In such an embodiment, the resistance elements are the walls of the serpentine path.

Figure 3:
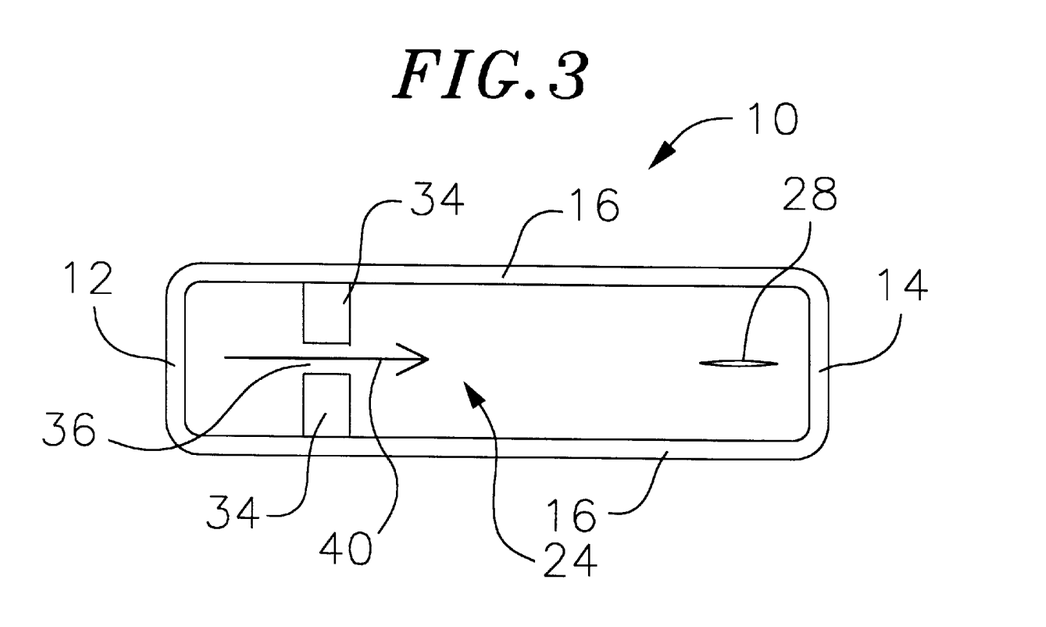
FIG. 3 is a schematic view of an emitter according to the invention.
Figure 4:
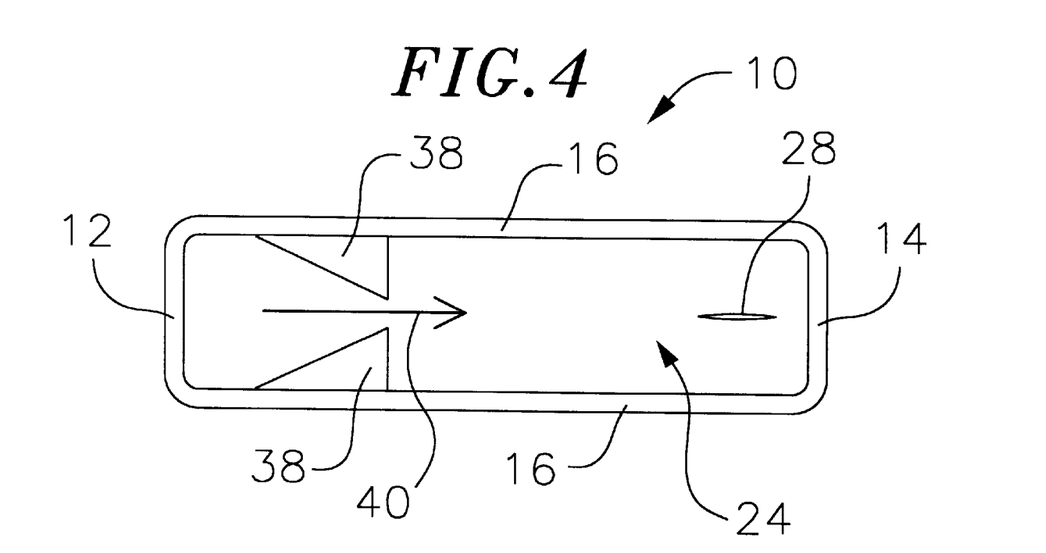
FIG. 4 is a schematic view of an alternative embodiment of an emitter according to the invention.

Alternatively, the resistance element can comprise a crosswall 34 containing an orifice 36, as shown in FIG. 3. Yet another alternative design for the resistance element, as shown in FIG. 4, comprises a nozzle section, i.e., a region that creates a nozzle effect by reducing the crosssectional area of the water flow path and diverting the flow, thus guiding the water into a narrow channel and decreasing the pressure of the water. In the depicted embodiment, the nozzle section comprises two converging sidewalls 38, which serve as the resistance elements. The converging sidewalls 38 increase the velocity of the water exiting the nozzle section, ultimately reducing the pressure of the water. Other designs for a nozzle section are disclosed in International Patent Application PCT/US 98/09254, filed May 6, 1998, the disclosure of which is incorporated herein by reference. In the emitters 10 depicted in FIGS. 3 and 4, water flows in the direction of arrow 40.

The above-described hoses 20 and emitters 10 can be made in different ways. For example, the hose 20 can be formed from an elongated strip of plastic film, which is typically 4 to 20 mil thick. The strip is folded longitudinally to form overlapping inner and outer longitudinal margins. A longitudinal rib seals the margins. By virtue of the longitudinal fold in the strip, the interior surface of the strip defines the water supply passage 22, which is connected to a source of water under pressure. Example of such hoses are described, for example, in U.S. Pat. Nos. 4,247,051, 4,984,739, 5,282,578, and 5,522,551, the disclosures of which are incorporated herein by reference. Alternatively, the hose 20 can be a seamless, tubular hose, which can be formed through an extrusion process. The hose 20 can be made of any suitable material, preferably polyethylene or a polyethylene blend. The product may be in tape form or in hard hose form.

The emitter 10 can made of a single piece of material, preferably plastic. Suitable materials for the emitter 10 include, but are not limited to polyethylene, polypropylene, thermoplastic elastomers, silicone, rubber, and polyurethane. Alternatively the emitter can be made from two or more materials that together form a single piece, which can be achieved, for example, by injection molding. The emitter can be flexible, i.e., capable of deforming to the shape of the outside of the hose, or hard, and thus already rounded to some extend to sealably fit on the outside of the hose.

Figure 5A:
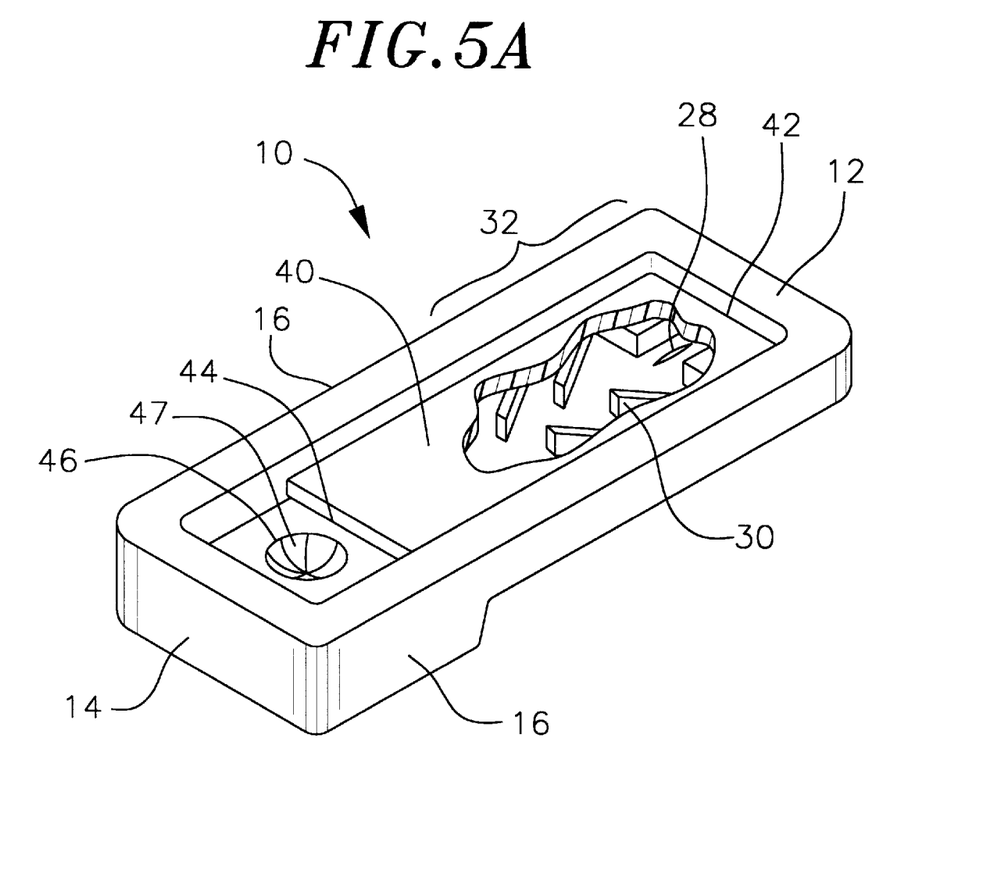
FIG. 5A is a perspective view of an emitter according to the invention having a flex bladder and a purging bulb.
Figure 5B:
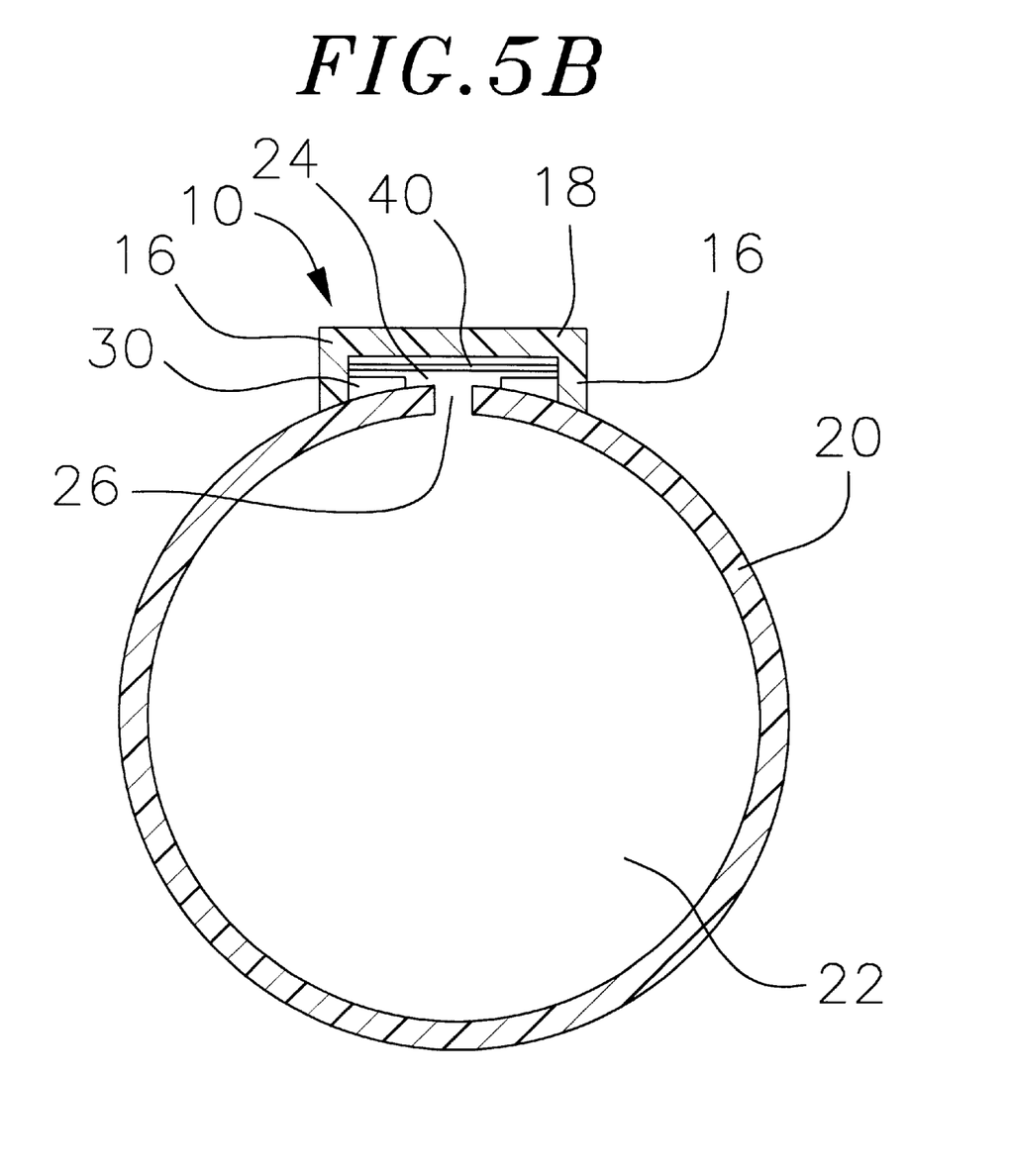
FIG. 5B is a cross-sectional view of a hose attached to the emitter of FIG. 5A.

Another embodiment of an external emitter useful in the invention is depicted in FIGS. 5A and 5B. The emitter 10 is similar to that described above, having a front wall 12, back wall 14, side walls 16 and a top wall 18. The inlet 26 from the hose 20 to the emitter 10 is positioned near the front wall 12. Unlike the embodiment described above, however, the outlet 28 is also positioned near the front wall 12. Water entering the emitter 10 through the inlet 26 flows between a thin flex bladder 40 and the surface of hose 20. The flex bladder 40 has a front end 42 and a back end 44. The front end 42 contacts the front wall 12, and the sides of the flex bladder 40 contact the side walls 16 of the emitter. The flex bladder 40 terminates before reaching the back wall 14, permitting water to flow around the back end 44 of the flex bladder and between the flex bladder 40 and the top wall 18. Preferably the flex bladder 40 is free floating within the emitter 10. Alternatively, the flex bladder 40 can be adhered to the emitter, or the emitter can be molded so that it holds the flex bladder in place, for example, by having a groove along its internal edge into which the edges of the flex bladder fit.

In the depicted embodiment, there is a turbulent flow section 32 between the flex bladder 40 and the top wall 18. Similar to the embodiment described above, the turbulent flow section 32 comprises alternating baffles 30. In the absence of water pressure, flex bladder 40 is spaced from baffles 30, i.e., there is a gap between the flex bladder and the baffles. At low water pressure, this gap is relatively large so that some of the water flowing through the turbulent flow section 32 bypasses the baffles 30 by flowing through the gap between the baffles 30 and the flex bladder 40. However, when pressure is exerted upon the flex bladder 40 by the water entering the emitter 10 through the inlet 26 from the main water supply passage 22, the flex bladder 40 is compressed toward the baffles 30, decreasing the size of the gap. The flow of water through the turbulent flow section 32 is thus restricted. When the water pressure entering the emitter 10 then decreases, the flex bladder 40 moves away from the baffles 30, increasing the size of the gap and thus the water flow through the turbulent flow section 32. Upon exiting the turbulent flow section 32, water drips from the device through outlet 28, similar to as described above. As would be recognized by one skilled in the art, the turbulent flow section 32 could be replaced in this embodiment with any other section containing one or more resistance elements as described above.

The flex bladder 40 design provides a pressure-compensating section within the emitter 10. As used herein, a "pressure-compensating section" is a flow passage that adjusts the flow rate of water passing through it in response to the water pressure in the large water supply passage 22 of the hose 20 by deformation of one or more walls, which in the depicted embodiment is the turbulent flow section 32. Preferably the emitters achieve an x-factor of 0.4 or less between 6 and 60 psi. More preferably the emitters achieve an x-factor of 0.35 or less, still more preferably 0.25 or less, and even more preferably 0.20 or less, between 6 and 60 psi. In a particularly preferred embodiment, the emitter achieves an x-factor 0.1 or less between 6 and 60 psi.

To achieve pressure compensation, the pressure-responsive flexible member, i.e., the flex bladder 40, must be made of a material capable of deforming in the pressure-compensating section. Preferably the flex bladder 40 is made of a single piece of material that is different from, and more deformable and elastic than, the materials of the emitter 10 and hose 20. A preferred material for the flex bladder 40 comprises a thermoplastic elastomer, for example, a polyethylene-based thermoplastic elastomer, having properties similar to those of thermoset rubber, such as metallocene. The flex bladder 40 could also be formed from another elastomeric material having similar flexibility properties.

Alternatively, the material of the flex bladder 40 is the same as the emitter material and/or the hose material, but is structurally capable of deforming sufficiently into the pressure-compensating section sufficiently to control flow within the emitter. For example, the thickness of the material of the flex bladder can be less than that of the emitter material and hose material so that the flex bladder is more deformable than the emitter and hose walls. In another embodiment, the flex bladder is made from two or more materials that together form a single piece., which can be achieved, for example, by injection molding.

The emitter 10 further comprises a purging bulb 46. The purging bulb 46 generates local pressure to back-flush or eject any contaminants in the emitter 10. The purging bulb 46 has a generally hemispherical-shape and protrudes from the top wall 18 of the emitter near the back wall 14. The internal region 47 of the purging bulb 46 is in fluid communication with the flow regulating channel 24. Thus, when a worker pushes the purging bulb 46, the combined volume of the flow regulating channel 24 and the internal region 47 of the purging bulb 46 decreases, flushing water from the emitter 10 and thus disgorging any foreign material causing blockage within the emitter 10, its inlet 26 or outlet 28. When the worker releases the purging bulb 46, it returns to its original shape.

As would be recognized by one skilled in the art, the purging bulb 46 need not be hemispherical, but can have any shape capable of achieving this function. Similarly, the purging bulb 46 need not protrude from the top wall 18, but can protrude from any external surface of the emitter 10. For example, in the depicted embodiment, the purging bulb 46 could alternatively protrude from the back wall 14 or one of the side walls 16. The purging bulb 46 can be made from the same material as the emitter or can be of a more flexible material, so long as the purging bulb is capable of deforming.

Figure 6A:
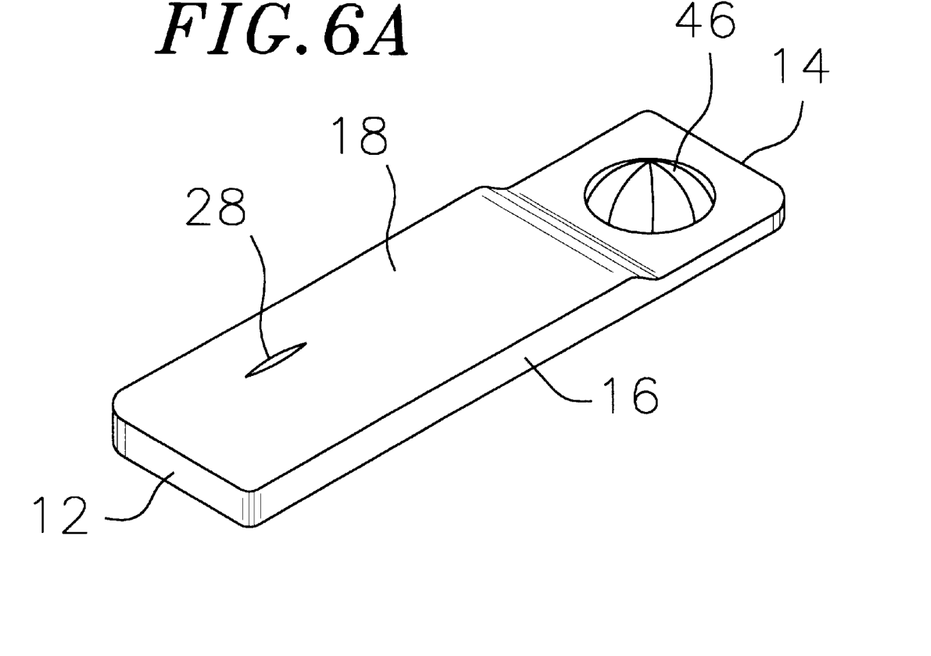
FIG. 6A is a perspective view of the top of an emitter according to the invention having a flexing membrane and a purging bulb.
Figure 6B:
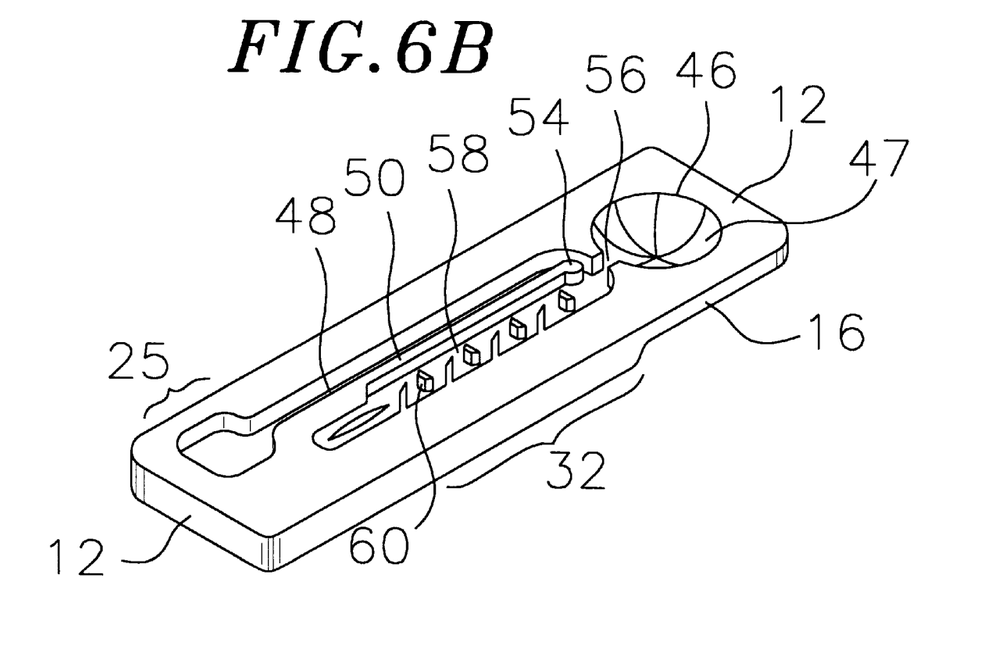
FIG. 6B is a perspective view of the bottom of the emitter of FIG. 6A.
Figure 6C:
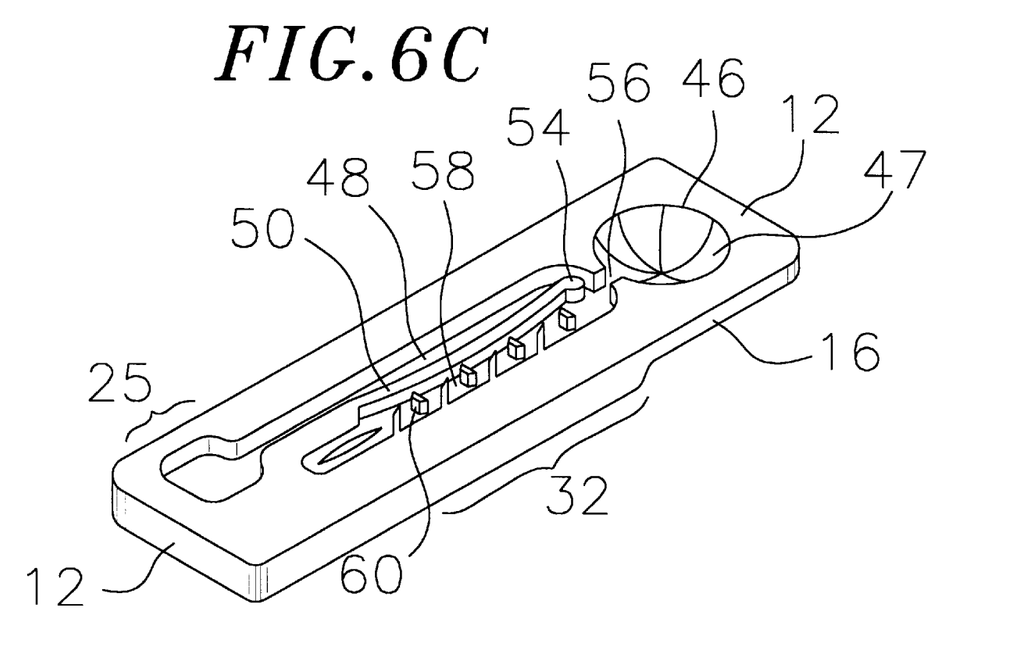
FIG. 6C is a perspective view of the emitter according to FIG. 6A showing how the flexing membrane deflects upon increased water pressure.

Yet another embodiment of the inventive emitter is illustrated in FIGS. 6A, 6B and 6C. This embodiment also achieves pressure compensation through the use of a pressure-responsive flexible member within the emitter. The emitter 10 has a front wall 12, back wall 14, side walls 16 and a top wall 18. The inlet 26 and outlet 28 are both located near the front wall 12. The flow regulating channel 24 comprises a long narrow path 48 defined on one side by a pressure-responsive flexing membrane 50. The flexing membrane 50 has a front end 52 and a back end 54. The front end 52 of the flexing membrane 50 is located near the front wall 12 and inlet 26, and the back end 54 of the membrane is located nearer the back wall 14.

Water thus flows into the emitter 10 through the inlet 26, passes through the long narrow path 48, and flows around the back end 54 of the flexing membrane 50. The water then enters a turbulent flow region 32, which contains baffles 30 and a plurality of chambers 58 having pillars 60 that define a tortuous path. The turbulent flow region 32 runs substantially parallel to the narrow path 48 and is separated from that path by the flexing membrane 50. When the water pressure in the narrow path 48 is relatively low, a relatively large gap exists between the pillars 60 and the flexing membrane 50. Water thus flows in a relatively straight path in the turbulent flow region 32.

However, as the water pressure increases in the narrow path 48, the water exerts pressure upon the flexing membrane 50, pressing it sideways toward the pillars 60 in the turbulent flow section 32, as shown in FIG. 6C. The gap between the pillars 60 and flexing membrane 50 decreases, forcing more to flow around the pillars 60 rather than bypass the pillars when flowing from chamber 58 to chamber. When the water pressure decreases, the flexing membrane 50 moves away from the pillars 60, again increasing the size of the gap.

After passing through the turbulent flow section 32, water drips from the emitter 10 through the outlet 26. As would be recognized by one skilled in the art, the turbulent flow section 32 could be replaced in this embodiment with any other section containing one or more resistance elements as described above.

The emitter further comprises a purging bulb 46, similar to that described above. The internal region 47 of the purging bulb 46 is in fluid communication with the flow regulating channel 24. In the depicted embodiment, the purging bulb 46 is located between the back wall 14 of the emitter 10 and the back end 52 of the flexing membrane 50. The internal region of the purging bulb 46 is in fluid communication with the flow regulating channel 24 by way of flow passage 56. The purging bulb 46 functions similar to the purging bulb described in the previous embodiment.

The emitter 10 of this embodiment can be molded as a single piece. Preferably the flexing membrane 50 is made of a material more flexible than that of the rest of the emitter 10. For example, the flexing membrane 50 can be made from a thermoplastic elastomer, and the emitter can be made from polyethylene. Thus the emitter can be injected molded from two or more materials. Alternatively, the flexing membrane 50 can be made of the same material as the emitter 10, but is thinner, allowing the flexing membrane 50 to deform more readily than the emitter.

Figures 7A, 7B:
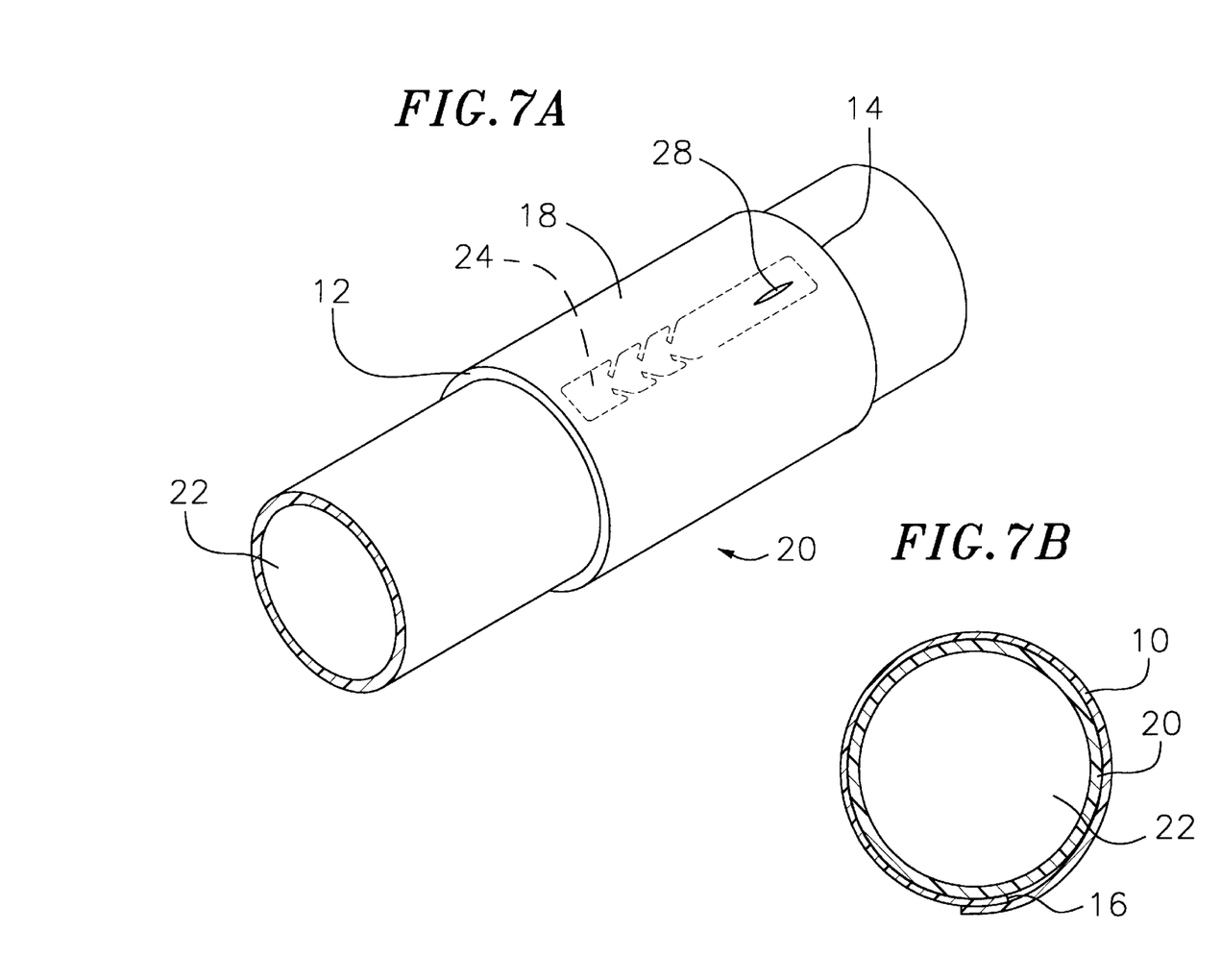
FIG. 7A is a perspective view of a drip irrigation hose having an emitter that wraps around the circumference of the hose.
FIG. 7B is a cross-sectional view of the hose of FIG. 7A.

FIGS. 7A and 7B illustrate another embodiment of a drip irrigation hose having an external emitter according to the invention. The emitter 10 comprises a front wall 12, a back wall 14, side walls 16, and a top wall 18. As shown in phantom, the emitter 10 comprises a flow regulating channel 24 having a turbulent flow section 32 similar to that described in the first embodiment. As shown in FIG. 7B, the sides of the emitter 10 extend completely around the hose 20 and overlap to enhance the adhesion of the emitter to the hose. However, the sides of the emitter need not extend completely around the hose 20. Alternatively, if desired, this embodiment can be modified so that the flow regulating channel 24 extends perpendicular to the water supply passage 22 in the hose 20.

The emitters can be made by any method known to those skilled in the art, such as injection, insert, or sequential molding. The emitters can then be adhered to the outside of the hose by any of several methods including, but not limited to, adhesive bonding, solvent bonding, thermal bonding and ultrasonic welding.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of this invention. Accordingly, the foregoing description should not be read as pertaining only to the precise structures described and illustrated in the accompanying drawings, but rather should be read consistent with and as support to the following claims which are to have their fullest and fair scope.

What is claimed is:

1. A drip irrigation hose comprising:
   a tubular body enclosing a water supply passage;
   an external emitter attached to the outside of the tubular body, the emitter comprising a front wall, a back wall, side walls and a top wall defining a flow regulating channel, and further comprising an outlet in at least once of the walls; and
   an inlet to the emitter, the inlet being in fluid communication with the water supply passage and the flow regulating channel;
   a purging bulb having an internal region in fluid communication with the flow regulating channel;
   whereby water flows through the water supply passage, through the inlet into the emitter, through the flow regulating channel, and out the outlet, and whereby pressure exerted on the purging bulb generates local pressure to back-flush or eject contaminants in the emitter.

2. A hose according to claim 1, wherein the emitter is adhesively bonded to the hose.

3. A hose according to claim 1, wherein the front wall, back wall and side walls are adhered to the hose.

4. A hose according to claim 1, wherein the emitter is located entirely outside the hose.

5. A hose according to claim 1, wherein the flow regulating channel is defined in part by the wall of the hose.

6. A hose according to claim 1, wherein the flow regulating channel comprises at least one resistance element.

7. A hose according to claim 1, wherein the flow regulating channel comprises a turbulent flow region.

8. A hose according to claim 1, wherein the flow regulating channel comprises a series of alternating baffles.

9. A hose according to claim 1, wherein the inlet is located near the front wall of the emitter and the outlet is located near the back wall of the emitter.

10. A hose according to claim 1, wherein the inlet and outlet are both located near the back wall of the emitter, and wherein the emitter further comprises a flexible member having front and back ends that divides that flow regulating channel into first and second parallel regions, the front end being attached near the front wall of the emitter and the back end extending near, but not contacting, the back wall of the emitter, whereby water flows into the emitter through the inlet, through the first parallel region, around the back end of the flexible member, through the second parallel region and out the outlet.

11. A hose according to claim 10, wherein the flexible member is capable of deforming into the second parallel region upon increased pressure in the first parallel region.

12. A hose according to claim 11, wherein the first parallel region is on the side of the second parallel region.

13. A hose according to claim 11, wherein the first parallel region is above the second parallel region.

14. A hose according to claim 1, wherein the emitter further comprises a pressure-compensating section.

15. A hose according to claim 14, wherein the emitter achieves an x-factor of 0.4 or less between 6 and 60 psi.

16. A hose according to claim 14, wherein the emitter achieves an x-factor of 0.25 or less between 6 and 60 psi.

17. A hose according to claim 14, wherein the emitter achieves an x-factor of 0.20 or less between 6 and 60 psi.

18. A hose according to claim 1, wherein the flow regulating channel in the emitter extends parallel to the water supply passage in the hose.

19. A hose according to claim 1, wherein the hose is in tape form.

20. A hose according to claim 1, wherein the hose is in hard hose form.

21. A drip irrigation hose comprising:

a tubular body enclosing a water supply passage;

an external emitter attached to the outside of the tubular body, the emitter comprising a front wall, a back wall, side walls and a top wall defining a flow regulating channel, and further comprising an outlet located near the back wall of the emitter; and an inlet to the emitter, the inlet being located near the back wall of the emitter and in fluid communication with the water supply passage and the flow regulating channel;

a flexible member having front and back ends that divides that flow regulating channel into first and second parallel regions, the front end being attached near the front wall of the emitter and the back end extending near, but not contacting, the back wall of the emitter, whereby water flows through the water supply passage, through the inlet into the emitter, through the first parallel region, around the back end of the flexible member, through the second parallel region and out the outlet.

22. A hose according to claim 21, wherein the flow regulating channel comprises a turbulent flow region.

23. A hose according to claim 21, wherein the flexible member is capable of deforming into the second parallel region upon increased pressure in the first parallel region.

24. A hose according to claim 23, wherein the first parallel region is on the side of the second parallel region.

25. A hose according to claim 23, wherein the first parallel region is above the second parallel region.

26. A hose according to claim 21, wherein the emitter further comprises a purging bulb having an internal region in fluid communication with the flow regulating channel, whereby pressure exerted on the purging bulb generates local pressure to back-flush or eject contaminants in the emitter.

* * * * *

UNITED STATES PATENT AND TRADEMARK OFFICE
CERTIFICATE OF CORRECTION

PATENT NO. : 6,015,102
DATED : January 18, 2000
INVENTOR(S) : Harold Daigle; Mark Huntley It is certified that error appears in the above-identified patent and that said Letters Patent is hereby corrected as shown below:

Column 8,
Line 16, replace "once" with -- one --.

Signed and Sealed this

Eighteenth Day of December, 2001

Attest:

Attesting Officer

JAMES E. ROGAN
Director of the United States Patent and Trademark Office